(12) United States Patent  (10) Patent No.: US 9,275,550 B1
Stefani et al.  (45) Date of Patent: Mar. 1, 2016

(54) DYNAMIC GROUND VEHICLE TRACKING AND REPORTING SYSTEM

(71) Applicant: ROCKWELL COLLINS, INC., Cedar Rapids, IA (US)

(72) Inventors: Rolf R. Stefani, West River, MD (US); James Gary Cooper, Jr., Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/506,611

(22) Filed: Oct. 4, 2014

(51) Int. Cl.
*G08G 1/14* (2006.01)
*G08G 5/00* (2006.01)
*H04W 4/12* (2009.01)
*G01C 21/00* (2006.01)

(52) U.S. Cl.
CPC .............. *G08G 5/0013* (2013.01); *G01C 21/00* (2013.01); *G08G 5/003* (2013.01); *G08G 5/0026* (2013.01); *H04W 4/12* (2013.01)

(58) Field of Classification Search
CPC ... G08G 5/003; G08G 5/0013; G08G 5/0026; H04W 4/12; G01C 21/00
See application file for complete search history.

(56) References Cited

U.S. PATENT DOCUMENTS

| | | | | |
|---|---|---|---|---|
| 2006/0095199 A1* | 5/2006 | Lagassey | .............. | G07C 5/008 701/117 |
| 2011/0210843 A1* | 9/2011 | Kummetz | .............. | G01S 5/0289 340/517 |
| 2012/0240191 A1* | 9/2012 | Husney | ................. | H04W 12/06 726/3 |
| 2013/0094538 A1* | 4/2013 | Wang | ..................... | H04B 1/707 375/141 |
| 2013/0203376 A1* | 8/2013 | Maier | ................... | H04W 4/005 455/404.2 |
| 2013/0297175 A1* | 11/2013 | Davidson | ............... | G07B 15/06 701/99 |
| 2013/0304348 A1* | 11/2013 | Davidson | ............. | G06Q 10/083 701/99 |
| 2013/0321174 A1* | 12/2013 | Eichhorst | ............... | G08G 1/087 340/917 |
| 2014/0149032 A1* | 5/2014 | Barrett | ................... | G01C 21/26 701/409 |

* cited by examiner

*Primary Examiner* — James Trammell
*Assistant Examiner* — James E Stroud
(74) *Attorney, Agent, or Firm* — Ronald E. Prass, Jr.; Prass LLP

(57) ABSTRACT

A system and method are provided for implementing low-cost real-time or near real-time tracking of a plurality of vehicles operating in a confined area, including on an airport. A MESH-type of network is provided to allow for the deployment and integration of large numbers of low power (line of sight) radios. The disclosed systems and network architecture include vehicle-mounted integrated end-device radio/GPS/power/antenna units, fixed or mobile router/repeater devices and fixed network gateways/coordinator units with Internet connectivity that may communicate near real-time end device (vehicle) position/track information for display on a situational awareness display device. The device/vehicle position/track information includes latitude, longitude, speed, direction, time/date, and identification of the end device (vehicle) to a server system capable of managing access to received data as well as capable of displaying received data on the situational awareness display device and of archiving the received data for other analytical uses.

21 Claims, 4 Drawing Sheets

DYNAMIC GROUND VEHICLE TRACKING AND REPORTING SYSTEM

BACKGROUND

1. Field of the Disclosed Embodiments

This disclosure relates to systems and methods for implementing real-time or near-real time tracking and display of a plurality of vehicles operating in an area, particularly using low cost line-of-sight communication devices operating as cooperating data transmission and relay nodes in a MESH network topology.

2. Related Art

Conventionally, there are multiple "airport centric" tracking requirements that exist to track vehicles operating in modern airport environments. At a high level, these tracking requirements include a number of individually-identifiable systems and system related functions based on the uses of individual vehicles and the areas on the airport property in which the individual vehicles are permitted to operate, among other considerations.

A first and critical level of vehicle tracking is provided for those vehicles that require that their locations be continuously monitored in operation and integrated into air traffic control (ATC) separation schemes for display, for example, on ground situational awareness displays. Based on the complexity involved in maintaining the situational awareness display and costs involved in critical tracking of these vehicles, a number of vehicles that are afforded this level of tracing is very carefully controlled. Safety of operations in and around aircraft justifies the expense in the case of these vehicles. This highest level tracking and display integration scheme is reserved for only certain ground vehicles that interact with active aircraft in areas where aircraft maneuver on runways and/or taxiways, for example. The positions of these vehicles are typically, of necessity displayed on a common situational awareness display to attempt to ensure controlled separation of vehicles and aircraft.

There are various, comparatively very expensive, technologies deployed to accomplish ground tracking of the runway- and taxiway-accessible vehicles. These technologies include the following. Airport Surface Detection Equipment, Model X (ASDE-X) is a system that enables air traffic controllers to detect potential runway conflicts by providing detailed coverage and display of movement of aircraft and certain vehicles on runways and taxiways. ASDE-X collects data from a variety of sources to track vehicles and aircraft on the airport movement area and obtain identification information from aircraft transponders. Surface Movement Guidance Control System (SMGCS) provides guidance to and control of aircraft, ground vehicles, and personnel on the movement area of an airport. Guidance relates to facilities, information, and advice necessary for pilots of aircraft or drivers of ground vehicles to navigate the movement area and to keep aircraft or vehicles on the surfaces or within the areas intended for their use. Control of the aircraft and vehicles involves a system of measures undertaken to prevent collisions and ensure traffic flows safely on the critical portions of the airport. Automatic Dependent Surveillance—Broadcast (ADS-B) provides a cooperative surveillance technology in which aircraft and vehicles equipped with ADS-B transceivers determine and broadcast their positions to compatible transceivers enabling the aircraft and/or vehicles to be tracked. The tracking information can be received and displayed by ATC ground stations to provide situational awareness and allow safe separation among participating aircraft and vehicles.

A second and comparatively less expensive system of tracking vehicles may be provided for airport service provider ramp vehicles. This level of tracking may be afforded to vehicles that do not operate on runway or taxi areas of the airport. The tracking of these vehicles may be limited to schemes that manage the vehicles by less stridently tracking locations and speeds of the vehicles in order to monitor safe operation of the vehicles and to ensure that the vehicles remain within their prescribed geographic boundaries (geofence). Locations of these ground assets are not displayed on ATC displays and they have no ATC services supplied to them.

Schemes also exist for what could be considered asset tracking on the airport. Containers, pallet and/or container unit load devices (ULDs), luggage carriers and buggies, and the like can be located on the airport grounds. Typically, low-cost active RFID-type technologies (e.g., less than $50 per asset) are provided. Per unit costs of such trackers are limited because some airports could have more 10,000 trackable containers/ULDs.

High availability "low cost" tracking systems are simply not conventionally available, leaving a large contingent of potential customers without a solution for their vehicle and asset tracking needs, particularly in real-time or near real-time. Basically, the only options available in today's airport environment for monitoring and tracking assets are based on the following technologies. Each having attributes that drive their costs up. As a first example, conventional ADS-B squitters cost in excess of $3,000 each. These components are those generally required for use on those vehicles operating in the aircraft movement areas noted above, necessitating certified avionics quality devices, which greatly increase their cost. As a second example, conventional vehicle tracking systems using any one of GSM, GPRS, 3G phone technology or the like to report positions carry with them recurring monthly costs of phone-type service that may be as much as a particular vehicle operator may be expected to be willing to pay for a complete system. As a third example, licensed VHF frequency band vehicle tracking systems necessitate the use of certified and qualified high power output devices. This hardware typically costs more than $600 per vehicle, still a potentially prohibitively high cost for equipping an entire fleet of vehicles.

SUMMARY OF THE DISCLOSED SUBJECT MATTER

Based on the above-specified needs and the indicated shortfalls in conventional systems for tracking large fleets of cooperating vehicles in a particular area, such as an airport, it may be advantageous to provide systems, processes, methodologies and/or techniques to airport operations-type customers and/or service providers that implement comparatively low cost vehicle tracking capabilities. These capabilities may provide the customers and/or service providers with a capacity to track their assets, monitor speeds and enforce security/no drive zones in a closed geographic area, such as an airport environment, to ensure that safety and security is enforced and maintained.

Exemplary embodiments of the systems and methods according to this disclosure may provide a lower cost alternative for tracking vehicles in real time and displaying information regarding those vehicles that do not require the ATC-cooperative tracking of runway and taxiway operating vehicles.

Exemplary embodiments may reduce a cost of providing highly accurate, near real-time tracking of vehicles for airport customers that do not require ATC-certified tracking systems.

Exemplary embodiments may account for the many physical obstacles located on an airport property that may block wireless communications paths.

Exemplary embodiments may provide a method of deploying relay devices to effectively aid in extending communications coverage as required in an obstacle-laden environment.

Exemplary embodiments may implement a MESH-type of network designed to satisfy the above-discussed fundamental requirements and to allow for the deployment and integration of large numbers of low power (line of sight) radios at an extremely low one-time cost per unit. In embodiments, those of skill in the art will recognize that a MESH-type network is a network topology in which each node (called a mesh node) relays data for the network. All nodes cooperate in the distribution of data in the network.

Exemplary embodiments may be based on implementing and using a dynamically self-healing MESH network designed to accommodate the geography of a defined specific airport on a case-by-case architecture.

Exemplary embodiments provide a system and/or a network architecture that may include vehicle-mounted integrated end-device radio/GPS/power/antenna units, fixed or mobile router/repeater devices and fixed network gateways/coordinator units with Internet connectivity that may communicate near real-time end device (vehicle) position/track information. In embodiments, the device/vehicle position/track information may include latitude, longitude, speed, direction, time/date, and identification of the end device (vehicle) to a server system capable of managing access to received data as well as capable of displaying received data on a situational awareness display device and/or archiving the received data for other analytical uses.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for implementing low-cost real-time or near real-time tracking of a plurality of vehicles operating in a confined area, including on an airport, will be described, in detail, with reference to the following drawings, in which.

DESCRIPTION OF THE DISCLOSED EMBODIMENTS

Figure 1:
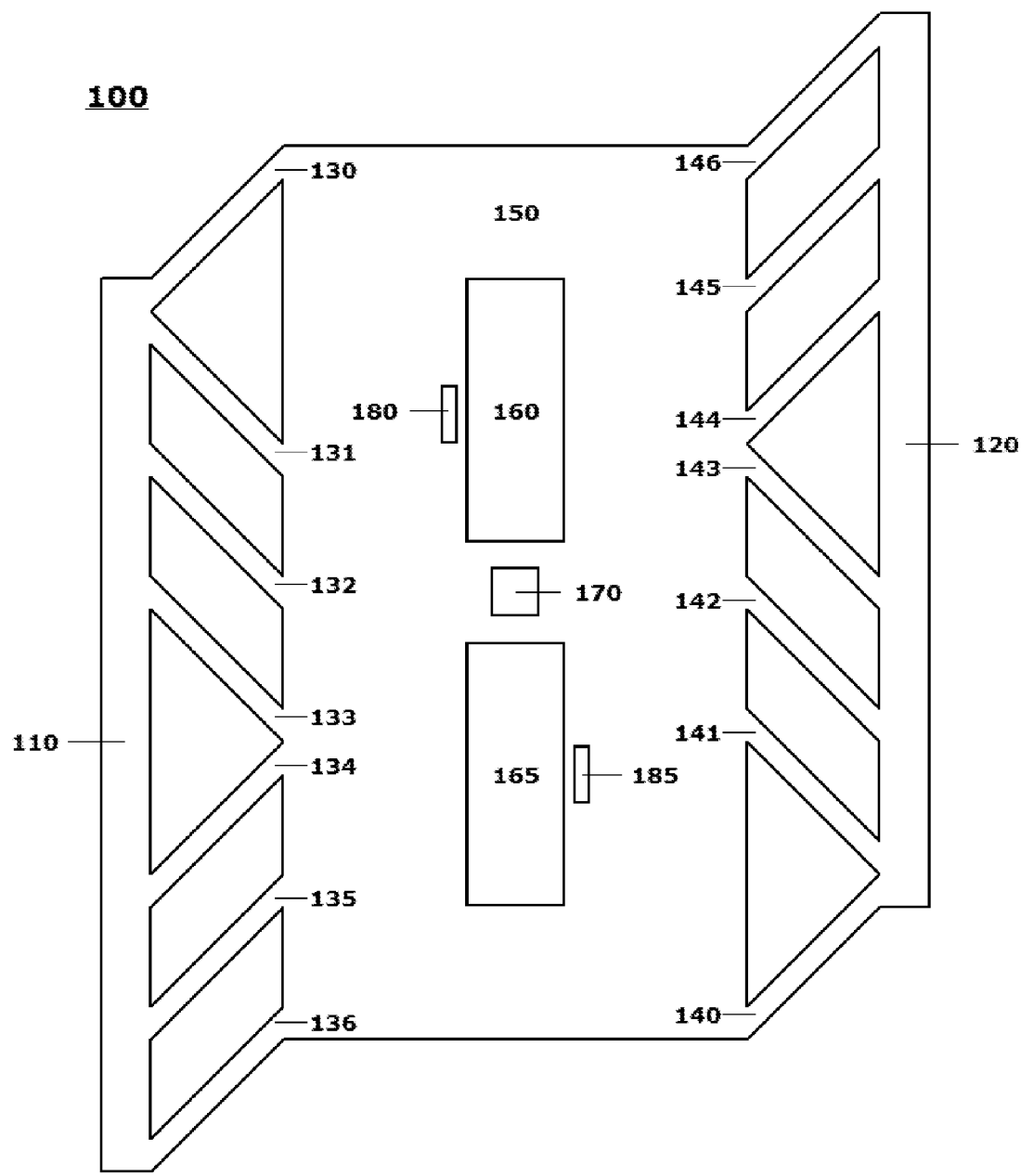
FIG. 1 illustrates an exemplary overview of an airport operating environment in which a real-time or near real-time vehicle tracking and reporting system according to this disclosure may be implemented.

The disclosed systems and methods for implementing real-time or near real-time vehicle tracking and reporting by passing vehicle tracking information via a MESH-type network topology and displaying vehicle tracking information on a centralized situational awareness display device will generally refer to this specific utility for those systems and methods. While the exemplary problem is described in an embodiment that is specific to an airport, the disclosed real-time or near real-time vehicle tracking and reporting techniques may be adaptable to, and equally beneficial for employment in, any scenario in which a plurality of vehicles occupy a particularly-bounded geographic area and line of sight communication may be established between a plurality of communicating nodes for establishing a MESH-type network topology for passing information between nodes in line of sight communication with one another.

Specific reference to, for example, the above-discussed scenario for airport operations as providing a particular example of where the systems and methods according to this disclosure may be particularly advantageously employed should be understood as being exemplary only, and not limiting the disclosed schemes, in any manner; to any particular vehicle operations; to any particular communication and information sharing device, unit or process; or to any particular communication link or protocol for implementing a communication link according to the disclosed schemes between any particular communication and/or information exchange nodes that maintain line-of-sight communication with each other in order that the systems and methods may be most advantageously implemented using low-cost line-of sight communicating devices.

Features and advantages of the disclosed embodiments are set forth in the description that follows, and may be, at least in part, obvious from this detailed description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in this disclosure. While specific implementations are discussed, it should be understood that this is done for illustration purposes only. A person skilled in the relevant art will recognize that other components and configurations may be used without departing from the spirit and scope of the disclosed embodiments.

The disclosed schemes may provide a capacity by which a low cost, reliable and rugged communication system is implemented for tracking of large number of vehicles operating in a confined geographic area. The disclosed systems and methods may be able to manage/accommodate thousands of communication devices by passing information through a MESH-type network topology in which, when, for example, a mobile communicating node mounted on a vehicle loses sight of a primary fixed communication node, the mobile communicating node may automatically establish alternative communications via one or more secondary fixed communication nodes or via pass-through communications with one or more other vehicle mounted communication nodes. In other words, when one node loses site of a particular communication node, device or tracked component, one or more alternative communication links/paths may then be established via one or more other nodes. The self-healing capability of a MESH network enables the network to operate when one node breaks down or a connection goes bad. As a result, the network is typically quite reliable, as there is often more than one path between a source and a destination in the network.

Each of a plurality of vehicles may be equipped with an integrated mobile tracking module that may include the following features. An integrated MESH-type network communication module such as a proprietary DigiMesh radio module may be provided. This radio module may operate in a portion of the unlicensed radio frequency (RF) spectrum that requires line-of-sight communications over a reasonably limited range, e.g., four miles or less. Exemplary embodiments may operate at data transmission rates on the order of 200 Kbps. An integrated Global Positioning Satellite (GPS) receiver may be provided in order to provide accurate geo-positioning/geo-locating of the module and, therefore, of the vehicle with which the module is associated, to for example, an accuracy in a range of about two meters. Control circuitry may be provided by which, for example, programmable parameters may be adjusted including, but not limited to, intervals at which geo-location/geo-position information for the vehicle may be transmitted from the vehicle to the network. Transmitted information may include vehicle identification (ID) information, vehicle latitude/longitude, vehicle speed of travel, vehicle direction of travel and time of day. An internal battery may be provided in order that the communication module may be usable apart from any vehicle as, for example, an autonomous device. Separately, or additionally, an external power interface may be provided to link, for example, power supplied by the vehicle systems to the communication module. A magnetic mount antenna may be provided to integrate or connect to various external antennas to the communication module.

The disclosed systems and methods may be implemented with no recurring fees for communications, e.g. mobile telephone and/or satellite connectivity services costs.

The disclosed systems and methods may be adaptable with ADS-B systems integrated.

The disclosed systems and methods are particularly adaptable to airports, which are relatively small and self-contained geographic areas and are generally well defined. Short range (line-of-sight) RF technologies may be considered for providing communications between all vehicles and end reporting/display systems. Tracking of large numbers of vehicles may be accomplished for a comparatively small area. There are many obstacles on an airport property that may block line-of-sight wireless communications paths, therefore, a method of deploying relay devices to effectively help extend communications coverage is required. A MESH-type network topology is appropriate in that it allows for the deployment of low power radios at a comparatively low one-time cost.

The disclosed systems and methods are based on using a dynamically self-healing MESH-type network designed to accommodate the geography of a defined specific airport on a case-by-case architecture. DigiMesh is a proprietary MESH networking protocol. Features of DigiMesh include a capacity for self-healing in that any node may enter or leave the network at any time without causing the network as a whole to fail. The DigiMesh network is based on all nodes being on a substantially equivalent level in the form of a peer-to-peer architecture in which no node hierarchy is necessarily established, and/or no parent-child node relationships are defined. DigiMesh represents a "quiet" protocol with reduced routing overhead through use of a reactive protocol similar to known Ad hoc On-Demand Distance Vector (AODV) Routing. Rather than maintaining a network map, routes may be independently discovered and created only when needed. Numbers of acknowledgments may be reduced such that only destination nodes may reply to route requests with reliable delivery of data being accomplished by means of acknowledgments. Low-power sleep modes with synchronized wake-ups are also supported, with variable sleep and wake times.

In exemplary embodiments, a 900 MHz DigiMesh radio module may be used according to the following specifications:

Frequency band: 902 to 928 MHz, with software selectable channel mask for interference immunity;
RF data rates: 10 Kbps or 200 Kbps;
Indoor/Urban range: Up to 2000 ft. (610 m) @ 10 Kbps; Up to 1000 ft. (305 m) @ 200 Kbps;
Outdoor/Line-of-sight range: Up to 9 miles (14 km) @ 10 Kbps; Up to 4 miles (6.5 km) @ 200 Kbps;
Power output: Up to 250 mW (+24 dBm), software selectable;
Receiver sensitivity: −101 dBm @ 200 Kbps; −110 dBm @ 10 Kbps;
Serial interface data rates: 9600 to 230400 baud;
GPIO: Up to 15 digital I/O, four 10-bit ADC inputs, two PWM outputs;
Networking topology: DigiMesh, repeater, point-to-point, point-to-multipoint, peer-to-peer;
Spread Spectrum type: FHSS (Frequency Hopping Spread Spectrum);
Supply voltage: 2.1V-3.6V DC (Footprint Recommendation: 3.0V-3.4V DC);
Transmit current: 215 mA (at 3.3V);
Receive current: 29 mA power-drain;
Sleep current: 2.5 to typical at 3.3V;
No. of channels: 64 channels available;
Addressing: PAN ID, Preamble ID, and 64-bit addresses;
Encryption: 128-bit AES;
Configuration method: AT and API, local or over-air;
Size: 0.960 in×1.297 in (2.438 cm×3.294 cm);
Weight: 0.10 oz. (3 g); and
Operating temperature: −40° C. to 85° C. (industrial).

Integrated stand-alone fixed router sites may include integrated router modems and communicating components such as those described above in substantially weathertight enclosures and incorporating solar panel power units. These sites may be used as fixed intermediate units or as the fixed end units (which may additionally include general or specialized CPU components) for autonomous operation and for providing the information received from the individual vehicle-mounted units to a centralized server, located on the airport property or located remotely at some centralized location, the server providing the vehicle location information to a situational awareness display device usable by a customer or end user, translating the location information as necessary to be directly integrated into situational awareness displays running all manner of display protocols.

Information collected in the centralized servers may be archived in order to perform analysis on collected data, including QOS from HDOP and VDOP. Information derived from analysis may have other value for customers in providing, as an example, fleet utilization statistics and other use and/or operating metrics for a particular group of vehicles FIG. 1 illustrates an exemplary overview of an airport operating environment 100 in which a real-time or near real-time vehicle tracking and reporting system according to this disclosure may be implemented. As shown in FIG. 1, the exemplary operating environment 100 may include one or more runways 110,120, a ramp area 150 and a series of taxiways 130-146 connecting the runways 110,120 to the ramp area 150. As indicated above, heightened tracking requirements are required for vehicles operating on the runways 110,120 or on the taxiways 130-146. As such, the disclosed systems should be considered restricted to vehicle operations on the ramp area 150.

Typical to airports (and other restricted vehicle operation areas) there may be one or more physical obstructions in a form of, for example, terminal buildings 160,165 and/or a control tower 170. One or more receiver ground stations 180,185 may be provided on the airport grounds. These receiver ground stations 180,185 may be provided to receive and transmit communications according to a number of communication protocols. The systems and methods according to this disclosure may leverage the presence of these installed receiver ground stations by installing or communicating with a particular industrial server style CPU with a receiver radio module (and an external antenna connection) that may be integrated with the CPU to coordinate autonomous operation of the unit separately as a coordinator node for the disclosed MESH-type network. These coordinators may be considered the end communication nodes in the network topology that may be used, for example, to communicate with the above-described central servers to receive, process, forward and/or store vehicle locating information transmitted from individual vehicle communication modules for a plurality of vehicles.

Figure 2:
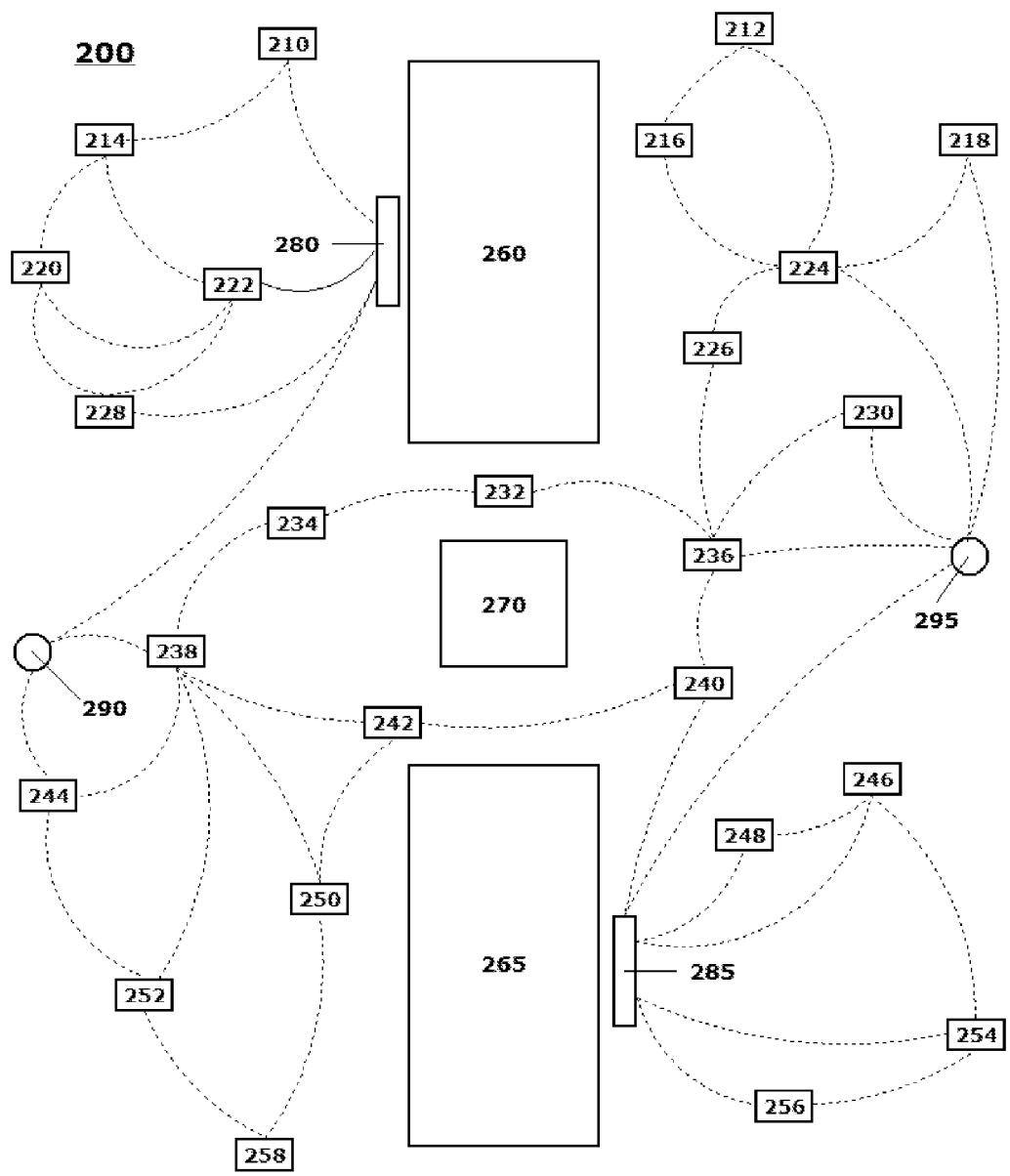
FIG. 2 illustrates an exemplary communication network overview for implementing a MESH-type network topology that is usable to provide real-time or near real-time vehicle tracking and reporting according to this disclosure.

FIG. 2 illustrates an exemplary communication network overview 200 for implementing a MESH-type network topology that is usable to provide real-time or near real-time vehicle tracking and reporting according to this disclosure. As shown in FIG. 2, a MESH-type network topology may be employed to provide short range communication between multiple nodes. In order to provide a lowest cost solution, given the multiple nodes, the communication between individual nodes may be limited to line-of-sight wireless RF communication between nodes. In order to facilitate this communication, particularly where certain obstructions in the form of buildings or other structures 260,265,270, the disclosed MESH-type network may include one or more fixed coordinator nodes 280,285, which may, as indicated above, the mounted appropriately on one or more of the structures and incorporate other communication capabilities.

Particularly programmed and autonomously operated CPU devices may be added to the fixed sites to provide these coordinator nodes 280,285 for specific communication with, and coordination of, the MESH-type network topology. Secondary fixed receiving sites 290,295 may be deployed temporarily or permanently as sites that may "cover" otherwise-obstructed areas in the MESH network coverage.

An objective of the MESH-type network topology shown in exemplary manner in FIG. 2 is to provide a flexible means for communication of geographic locating information data from a plurality of (even a large number of) individual vehicles 220-258 (with vehicle-mounted communication modules as described in detail above) operating within a fixed area. As shown in FIG. 2, an advantage of the disclosed systems and methods is that each vehicle-mounted communication module carried individually by each one of the plurality of vehicles 220-258 may itself act as a relay node for information received from vehicle mounted communication modules of other vehicles. The lines of communication shown in FIG. 2 are intended to exemplify an overarching communication scheme whereby each of the fixed or mobile nodes may be communicated directly with, or via multiple hops with, specific communication from the vehicle-mounted communication modules on each of the vehicles. When, for example, line-of-sight communication with one or more fixed nodes is lost, or anyone of the nodes falls out of the network, the network itself is self-healing and the particular communication modules seek other paths for communication by which to deliver the information they possess to a central server (not shown) via the one or more coordinator nodes 280,285.

Figure 3:
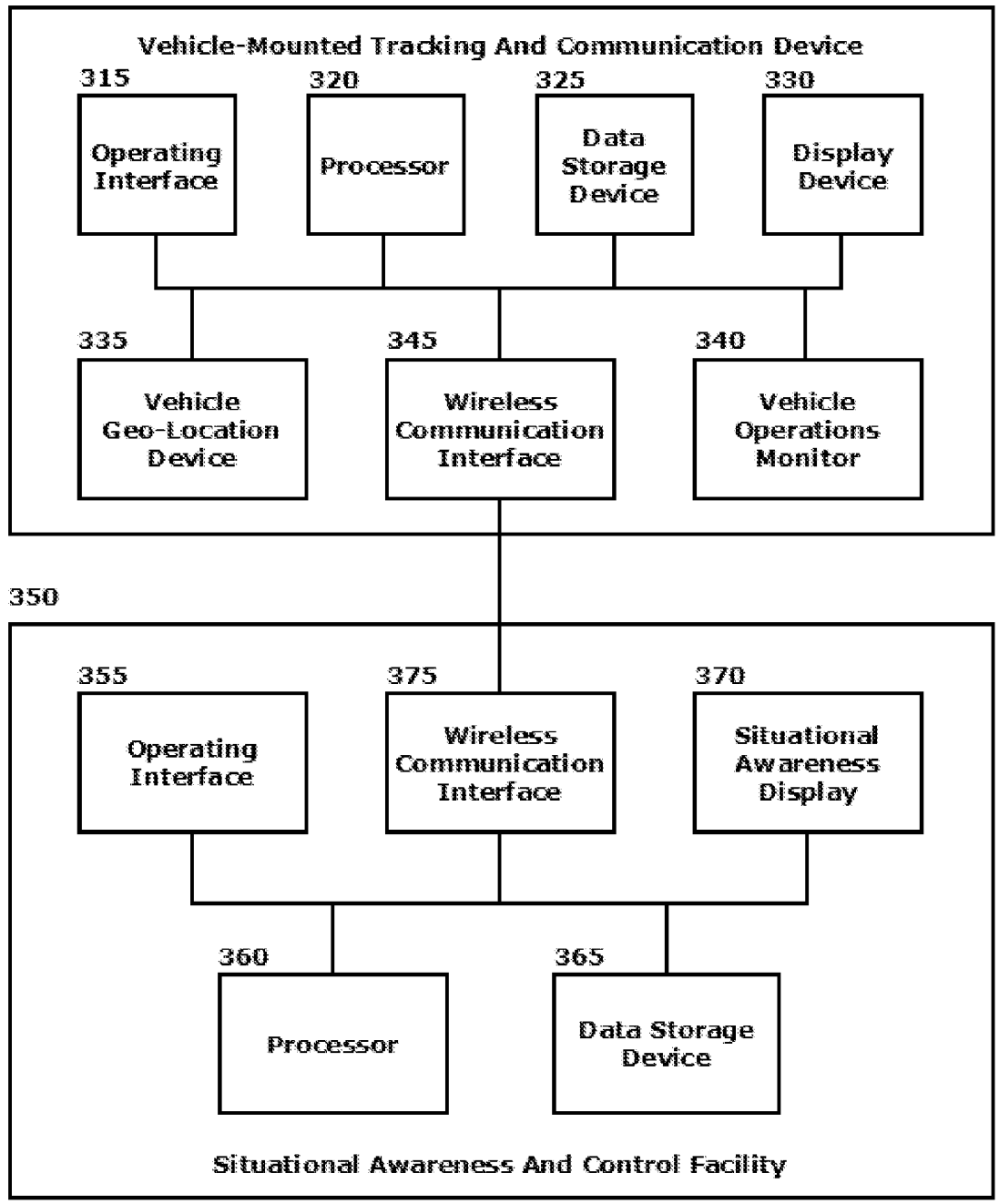
FIG. 3 illustrates an exemplary wireless communication system for passing tracking information for a vehicle between a vehicle-mounted tracking and communication device and a central facility for displaying vehicle location information according to this disclosure.

FIG. 3 illustrates an exemplary wireless communication system 300 for passing tracking information for a vehicle between a vehicle-mounted tracking and communication device 310 and a central situational awareness and control facility 350 were vehicle tracking information may be received, formatted for display, and/or archived for later analysis.

The vehicle-mounted tracking and communication device 310 may include an operating interface 315 by an operator may locally operate the vehicle-mounted tracking and communication device according to one or more user selectable functions. Otherwise, the operating interface 315 may be remotely activated to, for example, execute certain control functions over the vehicle-mounted tracking and communication device return. The operating interface 315 may take the form of any commonly known user-interactive device by which a user input and/or remote commands are input to an automated processing system including, but not limited to, a keyboard or a touchscreen, a mouse or other pointing device, a microphone for providing verbal commands, or any other commonly-known operating interface device.

The vehicle-mounted tracking and communication device 310 may include one or more local processors 320 for carrying out the individual operations and functions of the vehicle-mounted tracking and communication device 310. The processor 520 may reference, for example, each command input received from the operating interface to, for example, process received, or internally-generated, information for transmission via an integrated wireless communication interface 345 to other nodes in the network as shown, for example, in FIG. 2.

The vehicle-mounted tracking and communication device 310 may include one or more data storage devices 325. Such data storage device(s) 525 may be used to store data or operating programs to be used by the vehicle-mounted tracking and communication device 310, and specifically the processor(s) 320 in carrying into effect the disclosed operations and functions. Data storage device(s) 325 may be used to temporarily store location and/or operating information generated for the vehicle when, for example, the control input has been provided to the processor 320 to transmit the location and/or operating information only at particular intervals.

The data storage device(s) 325 may include a random access memory (RAM) or another type of dynamic storage device that is capable of storing updatable database information, and for separately storing instructions for execution of system operations by, for example, processor(s) 320. Data storage device(s) 325 may also include a read-only memory (ROM), which may include a conventional ROM device or another type of static storage device that stores static information and instructions for processor(s) 320. Further, the data storage device(s) 325 may be integral to the vehicle-mounted tracking and communication device 310, or may be provided external to, and in wired or wireless communication with, the vehicle-mounted tracking and communication device 310, including as cloud-based storage and/or processing elements.

The vehicle-mounted tracking and communication device 310 may include at least one display device 330, which may be configured as one or more conventional mechanisms that output information to a user, including, but not limited to, a display screen on a GUI associated with the vehicle-mounted tracking and communication device 310 to provide, for example, a graphical depiction of an operating area for the vehicle, or an indication of which one or more nodes in the communication network vehicle-mounted tracking and communication device 310 may be in communication with.

The vehicle-mounted tracking and communication device 310 may include a vehicle geo-location device 35. Typically, vehicle geo-location device 335 will consist of a Global Positioning Satellite (GPS) system receiver mounted on the vehicle, or integrated within the vehicle-mounted tracking and communication device 310. Other systems by which geo-location of a vehicle may be determined may otherwise constitute the vehicle geo-location device 335.

The vehicle-mounted tracking and communication device 310 may include one or more vehicle operations monitors 340. The one or more vehicle operations monitors 340 may be used in conjunction with, or separately from, the vehicle geo-location device 335 to provide movement information for the vehicle, including speed and direction of travel. The one or more vehicle operations monitors 340 may be installed on the vehicle to monitor all manner of functions of the vehicle.

The vehicle-mounted tracking and communication device 310 may include at least one wireless communication interface 345 that may generally be in a form of a short-range, line-of-site radio as described in detail above. The wireless communication interface 345 acts as a single node in a wireless MESH-type network topology, as also described in detail above.

All of the various components of the vehicle-mounted tracking and communication device 310, as depicted in FIG. 3, may be connected internally within the vehicle-mounted tracking and communication device 310, as shown and as described, via combinations of wired and wireless communication pathways to facilitate vehicle data collection and vehicle data transmission or relay as a node in the MESH network.

The vehicle-mounted tracking and communication device 310 may communicate via one or more nodes with a wireless communication node 375, which may be a fixed relay or coordinating node, as described above, associated with a situational awareness and control facility 350.

The situational awareness and control facility 350 may include its own operating interface 355 by which operations of the situational awareness and control facility 350 may be controlled. Specifically, collection of information from a plurality of vehicle-mounted tracking and communication devices 310 and display of that information on some manner of situational awareness display device 370 may be manually or automatically controlled. This operating interface 355 may be in any of the configurations described above with respect to the operating interface 315 in the vehicle-mounted tracking and communication device 310.

The situational awareness and control facility 350 may include one or more local or remote processors 360, which may include a local on-site server or a remote server at some specified centralized location, for processing and directing display of received vehicle data, for translating vehicle data for direct integration on a situational awareness display device in accordance with a display format used by the device, for directing archiving of the data for example to one or more local or remote data storage devices 365 and for conducting analysis of the collected information according to a user or customer desire.

The situational awareness and control facility 350 may include one or more data storage devices 365. Such data storage device(s) 365 may be used to store data or operating programs to be used by the situational awareness and control facility 350, and specifically the processor(s) 360 in carrying into effect the disclosed operations and functions. Data storage device(s) 365 may be used to store information that will aid the processor 360 in the situational awareness and control facility 350 in generating the graphical information to be transmitted to, and displayed on, the situational awareness display device 370. The data storage device(s) 365 may individually be configured as described above with respect to data storage device(s) 325 in the vehicle-mounted tracking and communication device 310.

The situational awareness and control facility 350 may include at least one situational awareness display 370, which may be configured as one or more conventional mechanisms that visually output information to a user. The at least one situational awareness display 370 may display an overall situational awareness picture with at least operating information regarding one or more vehicles operating in a confined area the operating information including a vehicle ID, vehicle latitude/longitude, vehicle speed and/or direction of travel and/or time of day in a graphical format with capabilities for the user to view vehicular operations in the confined area.

All of the various components of the situational awareness and control facility 350, as depicted in FIG. 3, may be connected to each other, via combinations of wired and wireless communication pathways to facilitate data exchange. Particular components may be co-located with one another or may be remotely located in, for example, a central location.

It should be appreciated that, although depicted in FIG. 3 as a series of separate discrete units with specific operating functionalities, the various disclosed elements of the exemplary system 300 may be arranged in any combination of sub-systems as individual components or combinations of components. In other words, no specific configuration is to be implied by the depiction in FIG. 3. Further, although depicted as individual units for ease of understanding of the details provided in this disclosure regarding the exemplary system 300 components, it should be understood that the described functions of any of the individually-depicted components may be undertaken, for example, by one or more processors within, connected to, and/or in communication with the separate system components of the vehicle-mounted tracking and communication device 310 and the situational awareness and control facility 350.

Figure 4:
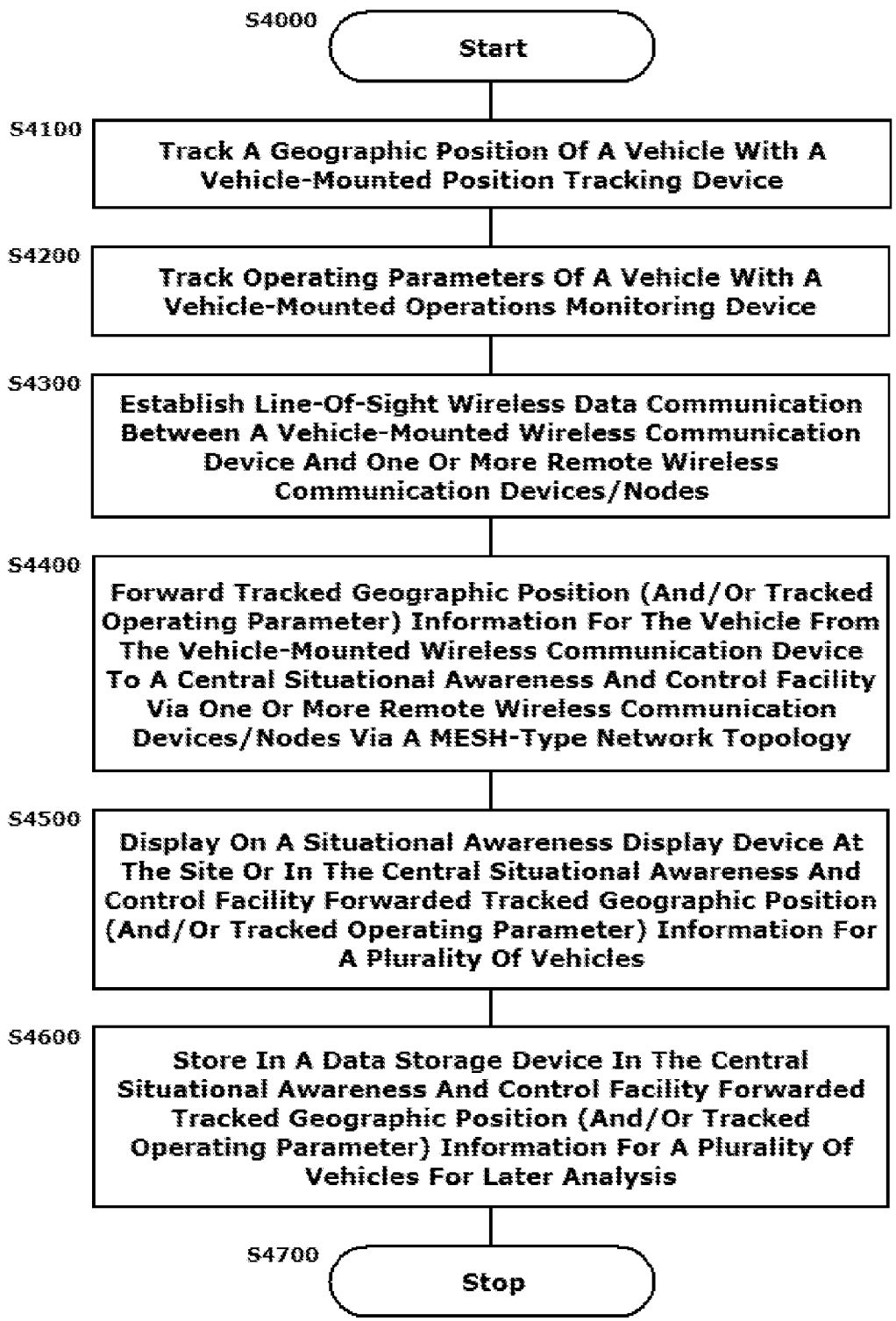
FIG. 4 illustrates a flowchart of an exemplary method for implementing real-time or near real-time vehicle tracking and reporting according to this disclosure.

The disclosed embodiments may include an exemplary method for implementing real-time or near real-time vehicle tracking and reporting. FIG. 4 illustrates a flowchart of such an exemplary method. As shown in FIG. 4, operation of the method commences at Step S4000 and proceeds to Step S4100.

In Step S4100, a geographic position of a vehicle may be tracked or otherwise determined by way of a vehicle-mounted position tracking device. Operation of the method proceeds to Step S4200.

In Step S4200, operating parameters of the vehicle may be tracked or otherwise determined by way of a vehicle-mounted operations monitoring device. Operation of the method proceeds to Step S4300.

In Step S4300, line-of-sight wireless data communication may be established between a vehicle-mounted wireless communication device and one or more remote wireless communication devices/nodes. Operation of the method proceeds to Step S4400.

In Step S4400, tracked geographic position (and/or tracked operating parameter) information for the vehicle may be forwarded from the vehicle-mounted wireless communication device to a central situational awareness and control facility via one or more remote wireless communication devices/nodes operating a MESH-type network topology. Operation of the method proceeds to Step S4500

In Step S4500, the forwarded tracked geographic position (and/or tracked operating parameter) information for a plurality of the vehicles may be graphically or otherwise displayed on some form of situational awareness display device at a site or at a central situational awareness and control facility. Operation of the method proceeds to Step S4600.

In Step S4600, the forwarded tracked geographic position (and/or tracked operating parameter) information for the plurality of the vehicles may be stored in a data storage device in the central situational awareness and control facility for later analysis. Operation of the method proceeds to Step S4700, where operation of the method ceases.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. The hardware circuits, firmware, or software-executable instructions may include individual program modules executed by the one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in tracking operations of multiple (even large numbers of) vehicles using many and widely varied system components.

Embodiments within the scope of this disclosure may also include computer-readable media having stored computer-executable instructions or data structures that may be accessed, read and executed by one or more processors in differing devices, as described. Such computer-readable media can be any available media that can be accessed by a processor, general purpose or special purpose computer. By way of example, and not limitation, such computer-readable media may comprise RAM, ROM, EEPROM, CD-ROM, flash drives, data memory cards or other analog or digital data storage devices that may be used to carry or store desired program elements or steps in the form of accessible computer-executable instructions or data structures. When information is transferred or provided over a network or another communication connection, whether wired, wireless, or in some combination of the two, the receiving processor may properly view the connection as a computer-readable medium. Thus, any such connection is properly termed a computer-readable medium. Combinations of the above should also be included within the scope of the computer-readable media for the purposes of this disclosure.

Computer-executable instructions may include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions, or associated data structures, represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual user, vehicle operator, and/or other interested party, where each user may individually employ components of the disclosed systems and methods to their advantage. This enables each user to enjoy the benefits of the disclosed embodiments even if any one of the large number of possible applications do not need some portion of the described functionality. In other words, there may be multiple instances of the disclosed systems each processing the content in various possible ways. It does not necessarily need to be one system used by all end users. Accordingly, the appended claims, and their legal equivalents, should only define the disclosed embodiments, rather than any specific example given.

We claim:

1. A system for geo-locating multiple vehicles operating in an area, comprising:
   at least one fixed primary network communication node;
   a plurality of vehicle-mounted communication devices mounted one each on a plurality of vehicles, at least one of the plurality of vehicle-mounted communication devices for at least one of the plurality of vehicles being in line of sight communication with the at least one fixed primary network communication node; and
   a plurality of vehicle-mounted location devices mounted the plurality of vehicles, each of the plurality of vehicle-mounted location devices communicating with a respective one of the plurality of vehicle-mounted communication devices to provide geo-location information for a respective one of the plurality of vehicles,
   each of the plurality of vehicle-mounted communication devices and the at least one fixed primary network communication node operating as nodes of a wireless mesh network for providing geo-location information for each one of the plurality of vehicles to a centralized location via
   (1) line of sight electronic communication between at least a first one of the plurality of vehicles and the at least one fixed primary network communication node when the at least the first one of the plurality of vehicles maintains line of sight to the at least one fixed primary network communication node; and
   (2) line of sight electronic communication between at least a second one of the plurality of vehicles and the at least the first one of the plurality of vehicles when the at least the second one of the plurality of vehicles is out of line of sight to the at least one fixed primary network communication node.

2. The system of claim 1, the mesh network being a proprietary DigiMesh network.

3. The system of claim 1, the at least one fixed primary communication node an integrated processor, the at least one fixed primary network communication node receiving the geo-location information for the plurality of vehicles and forwarding the geo-location information for the plurality of vehicles for display on a situational awareness display device in the centralized location.

4. The system of claim 3, the geo-location information for the plurality of vehicles being forwarded from the at least one primary communication node to a central server in the centralized location, the central server translating the forwarded geo-location information for the plurality of vehicles into a graphical display format that provides direct integration of the forwarded geo-location information into the situational awareness display device in the centralized location.

5. The system of claim 1, further comprising at least one fixed relay node that supplements the plurality of vehicle-mounted communication devices and the at least one primary network communication node as an additional node of the wireless mesh network to increase an opportunity for the at least the first one of the plurality of vehicles to be in line-of-sight of a fixed node for relaying the geo-location information for the each one of the plurality of vehicles via the line-of-sight electronic communication.

6. The system of claim 5, the at least one fixed relay node including a communicating device in a weathertight enclosure, an external antenna and a solar panel power supply.

7. The system of claim 1, at least one of the plurality of vehicle-mounted location devices being a Global Positioning Satellite receiver.

8. The system of claim 1, the plurality of vehicle-mounted communication and the plurality of vehicle-mounted location devices being components of integral units installed respectively on the plurality of vehicles.

9. The system of claim 8, the integral units further comprising respective internal power supply and antenna connections for connecting vehicle mounted antennas to the integral units.

10. The system of claim 1, the nodes of the mesh network communicating according to selectable frequencies in a range of about 902 MHz to about 928 MHz.

11. The system of claim 1, further comprising vehicle-mounted operations monitoring units that monitor operations at least some of the plurality of vehicles and that communicate information on monitored operations of the at least some of the plurality of vehicles to the at least one fixed primary communication node via the plurality of the vehicle-mounted communication devices in the mesh network.

12. A method for geo-locating multiple vehicles operating in an area, comprising:
tracking a geo-location of each one of a plurality of vehicles using a vehicle-mounted location device mounted on the each one of the plurality of vehicles;
communicating the tracked geo-location for at least a first one of the plurality of vehicles from a separate vehicle-mounted communication device mounted on the at least the first one of the plurality of vehicles directly to the at least one fixed communication node when in line-of-sight of the at least one fixed communication node; and
communicating the tracked geo-location for at least a second one of the plurality of vehicles from a separate vehicle-mounted communication device mounted on the at least the second one of the plurality of vehicles via the at least the first one of the plurality of vehicles to the at least one fixed communication node when at least the second one of the plurality of vehicles is not in line-of-sight of the at least one fixed communication node;
displaying on a situational awareness display device in a centralized location geo-location information for the plurality of vehicles.

13. The method of claim 12, the mesh network being a proprietary DigiMesh network.

14. The method of claim 12, the geo-location information for the plurality of vehicles being displayed on the situational awareness display device in the centralized location in a graphical display format.

15. The method of claim 14, further comprising forwarding the geo-location information for the plurality of vehicles from the at least one fixed primary communication node to a central server in the centralized location, the central server translating the forwarded geo-location information for the plurality of vehicles into the graphical display format to provide direct integration of the information into the situational awareness display device in the centralized location.

16. The method of claim 12, further comprising relaying at least a portion of the geo-location information for the plurality of vehicles from respective vehicle mounted-communication devices through at least one fixed relay node that supplements the vehicle-mounted communication devices and the at least one primary network communication node as an additional node of the wireless mesh network to increase an opportunity for the at least the first one of the plurality of vehicles to be in line-of-sight of a fixed node.

17. The method of claim 16, the at least one fixed relay node including a communicating device in a weathertight enclosure, an external antenna and a solar panel power supply.

18. The method of claim 12, the vehicle-mounted location device being a Global Positioning Satellite receiver.

19. The method of claim 12, the vehicle-mounted communication device and the vehicle-mounted location device being components of an integral unit mounted to the vehicle.

20. The method of claim 19, the integral unit further comprising an internal power supply and an antenna connection.

21. The method of claim 12, the nodes of the mesh network communicating according to selectable frequencies in a range of about 902 MHz to about 928 MHz.

* * * * *